UNITED STATES PATENT OFFICE.

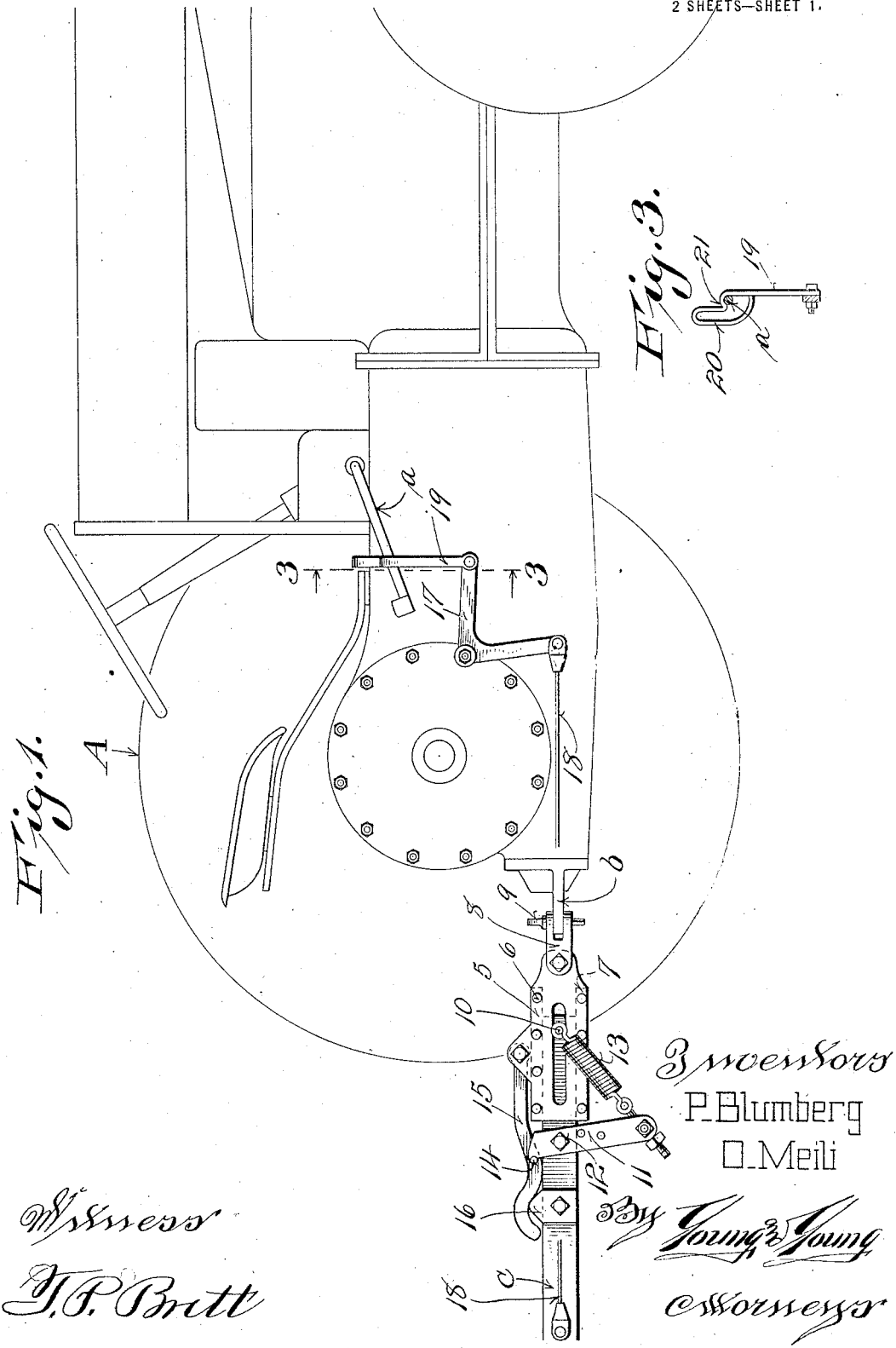

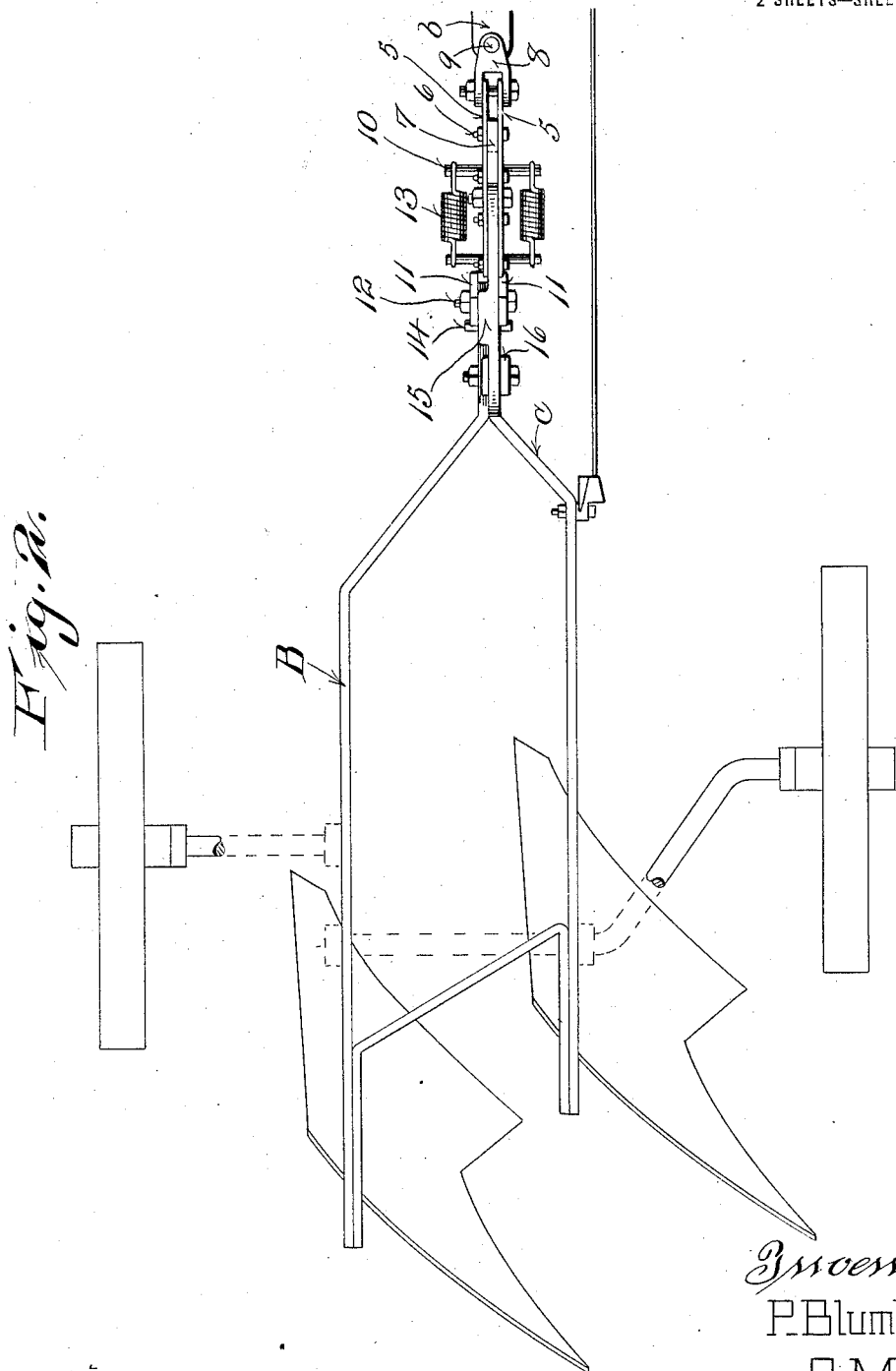

PAUL BLUMBERG AND OTTO MEILI, OF NEW HOLSTEIN, WISCONSIN.

PLOW CONNECTION FOR TRACTORS.

1,365,299.   Specification of Letters Patent.   Patented Jan. 11, 1921.

Application filed October 27, 1919. Serial No. 333,786.

*To all whom it may concern:*

Be it known that we, PAUL BLUMBERG and OTTO MEILI, both citizens of the United States, and residents of New Holstein, in the county of Calumet and State of Wisconsin, have invented certain new and useful Improvements in Plow Connections for Tractors; and we do hereby declare that the following is a full, clear, and exact description thereof.

Our invention relates to new and useful improvements in draft connections, more particularly of that type which is adapted to release the tractor on the occurrence of a certain maximum permitted resistance by the member which is drawn, this type of device finding particular application in connecting an automobile tractor with a plow or other agricultural implemenet, whereby an independent forward movement of the tractor to release its clutch may be permitted when the draft load becomes excessive.

It is in general the object of our invention to simplify and otherwise improve the structure and to increase the efficiency of devices of this character. It is more particularly an important object of our invention to provide a releasable draft connection of the character described, which has its parts automatically reëngageable upon backing the tractor toward the structure which is drawn.

Releasable draft connections of this character usually provide a spring coupling which operates to release the tractor clutch when the spring has been stretched by the excessive load. Hence, in this type of device, as soon as the clutch of the tractor has been released, the tension stored in the spring coupling will draw the tractor back, thus permitting the clutch to reëngage and procure a succeeding forward movement of the tractor.

It is further an important object of our invention to provide an arrangement, wherein upon release of the draft connection to actuate the clutch, the occurrence of a retrograde spring tension will be avoided.

With the above and other objects and advantages in view, which will be apparent as the description proceeds, our invention resides in the novel features of construction, combination and arrangement of the parts as hereinafter described and defined by the appended claims.

In the accompanying drawings:

Figure 1 is a side elevational view of a draft connection embodying our invention.

Fig. 2 is a plan view thereof.

Fig. 3 is a detail sectional view on the line 3—3 of Fig. 1.

Referring now more particularly to the accompanying drawings, A designates a conventional automobile tractor structure which is provided with the usual transmission clutch lever $a$ which projects rearwardly from its pivot connection and which is movable downwardly to release the clutch, said tractor having a draft lug $b$ at its rear end. The device drawn by the tractor comprises in the present instance a conventionally shown plow B having a forwardly extending draft tongue $c$.

The present embodiment of our improved draft connection for these members comprises a housing or socket member for the draft tongue, comprising in the present instance a pair of side plates 5 connected along their upper and lower edges by bolts 6 passed therethrough and through the longitudinal top and bottom bars 7, the forward end of said socket member being secured by a knuckle joint 8 and king pin 9 to the tractor lug $b$. This socket member receives the forward end of the draft tongue $c$ and is provided with longitudinal slots in its side through which project pins 10 carried by the draft tongue. A pair of levers 11 are intermediately mounted on a bolt 12 passed through the draft tongue rearwardly of the socket member and a pair of relatively strong contractile coil springs are secured to the lower ends of these levers and to the pins 10 thus strongly urging the upper ends of the levers 11 in a rearward direction. These upper ends of the levers 11 are notched to engage pins 14 projecting laterally from the intermediate portion of a lever 15 which has its forward end pivoted to the socket member 5. The rear end portion of this lever 15 is upwardly bowed and normally embraces an upward cam projection 16 on the draft tongue $c$. Hence, traction stress within the coupling described is transmitted to the upper ends of the levers 11 from the pins 14, said levers being held against clockwise rocking movement by the tension of the springs 13 and thus imparting the traction stress to the draw bar. When this stress becomes excessive, the draw bar will be permitted to shift rearwardly relative to the socket member 5, and its independent rearward movement will lift the lever 15 by the action of the cam projection 16, thus raising the pins 14 from the spring levers 11 and permitting a decided rearward shift. This rearward shift is however, procured without additional spring tension, and thus there exists no tendency to draw the tractor back against the plow.

The clutch a is drawn downwardly in this shifting movement by an angle lever 17 pivoted preferably to one of the bolts of the rear axle housing. A link 18 connects the depending arm of this lever with the draft tongue c and a link 19 extends from the other arm of the lever and is provided with a loop 20 which embraces the clutch lever a, this loop being provided with an intermediate shoulder 21 at one side which normally receives the clutch lever, but which permits the link 19 to be shifted laterally whereby the clutch lever may rise to engaging position for the purpose of backing the tractor. The various parts of the connection are automatically reëngageable upon backing the tractor toward the member which is drawn, it being noted that both the cam member 16 and the upper ends of the spring levers 11 are beveled to facilitate their movement to reset position.

While we have shown and described a preferred embodiment of our invention, it will be appreciated that various changes and modifications of structure may be employed to meet differing conditions of use and manufacture, without departing in any manner from the spirit of our invention.

What is claimed is:

1. A draft connection of the class described, including a draft member, a tractor member having a controlling lever, means yieldably holding said draft member and tractor against relative movement, means operable upon relative movement between said draft member and tractor to prevent retrograde action of said yieldable holding means, and a connection between the draft member and controlling lever for operation of the latter.

2. A draft connection of the class described including a draft element, a tractor element, a member movably carried by one of said elements, a spring secured to said movable member and to said specified element, a second member connected with the other element and engageable with the movable member to procure tension of the spring upon relative movement between the elements, and a release member carried by the first specified element and engageable with said holding member upon continued relative movement between the elements.

3. A draft connection of the class described comprising a draft member, a tractor member, a lever intermediately pivoted to one of the members a spring connected with one end of the lever and the specified member, a second lever pivoted to the other member, a stop on said second lever engageable with the other end of the second named lever and a trip on the first specified member engageable with the second named lever.

4. A draft connection of the class described including a draft member, a tractor member slidably connected therewith for relative longitudinal movement, a lever intermediately pivoted to the draft member, a spring connected with the draft member and one end of said lever, a lever pivoted to the tractor member and extending toward the first named lever, a stop member on said holding lever engageable with the other end of the first named lever, the end of said holding lever being bowed to provide a cam surface and a projection on the tractor member engageable with said cam surface.

5. A draft connection of the class described including a socket member provided with longitudinal slots in its sides, a draft tongue slidable in said socket member, lateral projections on said tongue projecting through the slots, a pair of levers pivoted to the draft tongue, contractile springs connected with the said lateral projections and with adjacent ends of the levers, a holding lever pivoted to the socket member, stop projections on said holding lever engageable with the other ends of the first named levers and a trip member on the draft tongue engageable with said holding lever.

6. A draft connection of the class described including the combination with a draft member, and a tractor mechanism including a draft power controlling clutch lever of means yieldably holding said tractor mechanism and draft member against relative movement, means operable upon certain relative movement of said tractor mechanism to release said yieldable holding means and permit further relative movement and means operable upon said further relative movement for shifting said clutch lever.

In testimony that we claim the foregoing we have hereunto set our hands at New Holstein, in the county of Calumet and State of Wisconsin.

P. BLUMBERG.
O. MEILI.